(12) United States Patent
Jain et al.

(10) Patent No.: US 12,208,354 B2
(45) Date of Patent: Jan. 28, 2025

(54) METHOD OF DECARBONATING GAS STREAMS

(71) Applicant: Arkema France, Colombes (FR)

(72) Inventors: Sandeep Jain, Paris (FR); Leonel Gomes, Pau (FR); Alexandre Terrigeol, Gentilly (FR)

(73) Assignee: Arkema France, Colombes (FR)

( * ) Notice: Subject to any disclaimer, the term of this patent is extended or adjusted under 35 U.S.C. 154(b) by 1017 days.

(21) Appl. No.: 16/979,735

(22) PCT Filed: Mar. 14, 2019

(86) PCT No.: PCT/FR2019/050570
§ 371 (c)(1),
(2) Date: Sep. 10, 2020

(87) PCT Pub. No.: WO2019/186013
PCT Pub. Date: Oct. 3, 2019

(65) Prior Publication Data
US 2021/0008485 A1    Jan. 14, 2021

(30) Foreign Application Priority Data
Mar. 18, 2018   (FR) ...................................... 1852301

(51) Int. Cl.
*B01D 53/02* (2006.01)
*B01D 53/047* (2006.01)

(52) U.S. Cl.
CPC .......... *B01D 53/02* (2013.01); *B01D 53/0476* (2013.01); *B01D 2253/108* (2013.01); *B01D 2253/11* (2013.01); *B01D 2253/311* (2013.01); *B01D 2257/504* (2013.01)

(58) Field of Classification Search
CPC ................ B01D 53/02; B01D 53/0476; B01D 2253/108; B01D 2253/11; B01D 2253/311; B01D 2257/504; B01D 53/0462; B01D 53/047; B01D 2253/306; B01D 2253/308; B01D 2253/31; B01D 2258/025; B01D 53/04; Y02C 20/40; B01J 20/18; B01J 20/28
See application file for complete search history.

(56) References Cited

U.S. PATENT DOCUMENTS

| | | | |
|---|---|---|---|
| 3,161,461 A | 12/1964 | Deal et al. | |
| 4,459,142 A | 7/1984 | Goddin | |
| 5,531,808 A | 7/1996 | Ojo et al. | |
| 5,906,675 A | 5/1999 | Jain et al. | |
| 6,027,545 A | 2/2000 | Villarreal-Trevino | |
| 6,143,057 A | 11/2000 | Bulow et al. | |
| 6,537,348 B1 | 3/2003 | Hirano et al. | |
| 7,309,378 B2 | 12/2007 | Bancon et al. | |
| 7,608,134 B1 | 10/2009 | Plee | |
| 8,192,524 B2 | 6/2012 | Chinn et al. | |
| 8,298,986 B2 | 10/2012 | Jones et al. | |
| 9,682,361 B2 | 6/2017 | Brandt et al. | |
| 10,654,026 B1* | 5/2020 | Wendland | B01J 20/265 |
| 2007/0006732 A1* | 1/2007 | Mitariten | B01D 53/1462 95/237 |
| 2007/0062369 A1* | 3/2007 | Pfenninger | B01D 53/02 423/700 |
| 2007/0214959 A1* | 9/2007 | Le Bec | B01D 53/02 502/62 |
| 2008/0282892 A1 | 11/2008 | Deckman et al. | |
| 2017/0173555 A1 | 6/2017 | Akhtar et al. | |
| 2017/0217858 A1* | 8/2017 | Laroche | B01J 20/28092 |
| 2018/0008955 A1 | 1/2018 | Lutz et al. | |
| 2018/0036688 A1* | 2/2018 | Sundaram | B01D 53/0407 |
| 2018/0093896 A1* | 4/2018 | Xie | C01B 39/48 |
| 2018/0185817 A1* | 7/2018 | Stabler | B01J 20/3007 |
| 2018/0261882 A1* | 9/2018 | Chang | H01M 50/491 |

FOREIGN PATENT DOCUMENTS

| | | |
|---|---|---|
| DE | 102008046155 A1 | 9/2009 |
| EP | 2253915 A1 | 11/2010 |
| FR | 3032130 A1 | 8/2016 |
| JP | 2009222352 A | 10/2009 |
| KR | 20170142691 A | 12/2017 |
| WO | 2017042466 A1 | 3/2017 |

OTHER PUBLICATIONS

Korean Notice of Grounds for Rejection for Korean Application No. 10-2020-7026727, dated Jan. 15, 2022, 6 pages.
International Search Report and Written Opinion for International Application No. PCT/FR2019/050570, dated Sep. 2, 2019, 8 pages.

* cited by examiner

*Primary Examiner* — Dung H Bui
(74) *Attorney, Agent, or Firm* — Buchanan Ingersoll & Rooney PC

(57) ABSTRACT

The present invention concerns a method of decarbonating a gas stream containing from 15% to 60% carbon dioxide, by passage of the said gas stream over a zeolitic agglomerate comprising at least one binder and at at least one zeolite, and having a mesoporous volume of between 0.02 $cm^3 \cdot g^{-1}$ and 0.15 $cm^3 \cdot g^{-1}$ and a mesoporous volume fraction of between 0.1 and 0.5, preferably between 0.15 and 0.45.

7 Claims, No Drawings

METHOD OF DECARBONATING GAS STREAMS

CROSS-REFERENCE TO RELATED APPLICATIONS

This is the national phase of International Application No. PCT/FR2019/050570, filed 14 Mar. 2019, which claims priority to French Application No. 1852301, filed 18 Mar. 2018. The disclosure of each of these applications is incorporated herein by reference in its entirety for all purposes.

The present invention concerns the decarbonating, i.e. the separation of carbon dioxide ($CO_2$), from a gas stream containing the said carbon dioxide, such as for example in gas streams of steel mills where the carbon monoxide gas streams frequently contain very large quantities of carbon dioxide.

Indeed, it is already well known that it is possible to find $CO_2$ in more or less large proportions, for example ranging from 15% to 60% by volume, in gas streams, particularly those containing a high content of carbon monoxide (at least 10%) and possibly hydrogen sulphide (10 ppmv to 5000 ppmv)

Excess quantities of $CO_2$ cause numerous disadvantages, even problems, such as for example limited adsorption capacities due to faster saturation, therefore more frequent regenerations and accelerated aging of the product. These large quantities of $CO_2$ also represent an additional limitation for membrane processes, but also for those using a solvent, a cryogenic distillation system, and others; the separation then becomes a very large energy consumer and thus very expensive.

More specifically and by way of example, among gas streams to be decarbonated are steel mill gases that typically contain 20% to 50% $CO_2$ and 20% to 50% CO, possibly as well as minority species such as $H_2$, $N_2$, $CH_4$, $H_2S$, $H_2O$.

In producing iron (this also being true for producing other metals), iron oxides are placed in contact with a reduction gas, which is often a mixture composed essentially of CO and $H_2$. This reduction gas reacts with the iron oxides, forming $CO_2$ and $H_2O$ from the elemental iron. The gas produced therefore consists of a mixture of $CO_2$, $H_2O$, CO and $H_2$. Before being able to be used, this gas must again be enriched with CO and $H_2$. One solution can be the elimination of undesirable components, particularly the elimination of the impurities $CO_2$ and $H_2O$, by separation, selective adsorption for example.

The patent U.S. Pat. No. 3,161,461 describes an absorption method for separating acid gases present in gaseous mixtures by using specific solvents. However, the use of solvents is difficult to implement on an industrial scale, and the regeneration of the solvents often requires extremely large amounts of energy, involving problems of corrosion and enormous environmental limitations so that the method is often not cost-effective and thus is little used.

The patent U.S. Pat. No. 8,192,524 describes a method for decarbonating a gas stream having a volume rate of $CO_2$ of more than 10%, the method implementing at least one membrane unit comprising a plurality of polymer membranes in order to produce a permeate comprising at least 95% volumes of $CO_2$ and a gas stream depleted of $CO_2$. However, to make this method fully effective, and to ensure a good degree of separation, several stages of membranes are required, which leads to complex and costly processes that are difficult to exploit on the industrial scale.

The patent U.S. Pat. No. 4,459,142 discloses a cryogenic distillation method for separation of $CO_2$ present in a stream of $C_3$-$C_{10}$ hydrocarbons. However, the processes using such cryogenic distillation systems have the disadvantage of having to manage the formation of dry ice at very low temperature.

Also known is to use fixed bed adsorption methods for decarbonating gas streams. Thus for example, the patent U.S. Pat. No. 4,775,396 describes the selective adsorption of carbon dioxide present in non-acid gases (such as $N_2$, $H_2$ and $CH_4$) by a PSA (Pressure Swing Adsorption) method using a fixed adsorption bed comprising a Faujasite type zeolitic aluminosilicate containing at least 20% of at least one cationic species selected from the group composed of zinc, rare earths, hydrogen and ammonium, and containing at most 80% cations of alkaline or alkaline-earth metals.

Also known are TSA (Temperature Swing Adsorption) type methods, generally appropriate for decarbonating streams with low amounts of $CO_2$.

The patent U.S. Pat. No. 5,531,808 describes the decarbonation of gas streams comprising a majority of less polar gases than $CO_2$, by passing said gas streams through a type X zeolitic adsorption bed having an Si/Al atomic ratio of less than about 1.15, at temperatures above 20° C.

The patent U.S. Pat. No. 7,608,134 proposes the use of type X zeolite with Si/Al atomic ratio between 1.0 and 1.15, highly sodium exchanged, and agglomerated with a maximum binding material ratio of 20%, for decarbonating gas streams, in particular air polluted with $CO_2$.

The patent U.S. Pat. No. 6,143,057 describes composite adsorbents composed of zeolites in the form of microparticles of a size smaller than 0.6 µm and a macroporous inert binder. These composite adsorbents are used to separate gaseous components present in gas mixtures, and in particular to separate nitrogen or $CO_2$ present in air.

The patent U.S. Pat. No. 6,537,348 B1 discloses the use of 0.5-3.0 mm NaLSX or LiLSX beads to decarbonate gas having 50 mm Hg (67 mbar) of $CO_2$.

A method of prepurification of air is proposed in the patent U.S. Pat. No. 5,906,675. This method uses a three-bed adsorbent array functioning in PSA, and containing at least two adsorbents, one an alumina compound to eliminate the water and a little $CO_2$, and the other composed of zeolite to adsorb the remaining $CO_2$. While columns 1 and 2 are operating in PSA regime, the third is thermally regenerated; column one is then thermally regenerated while columns two and three are operating in PSA regime, and so on.

The patent U.S. Pat. No. 7,309,378 describes a method of purifying syngas of the type $H_2$/CO or $H_2$/$N_2$, consisting in removing the $CO_2$ as well as other impurities, by using an adsorbent of the NaLSX type, then desorbing during a regeneration step which may be performed by raising the temperature (TSA) and/or by reducing the pressure (VSA [Volume Swing Adsorption] or PSA).

However, it is difficult to decarbonate some gas streams heavily loaded with $CO_2$, especially when the gas stream to be purified contains high concentrations of CO because the separation system employed must have high $CO_2$ separation capacities and selectivities as well as adequate regenerability.

The patent U.S. Pat. No. 6,027,545 explains a method for producing direct reduced iron using a gas composed of CO and $H_2$ (with impurities of $CO_2$, $H_2O$ and $CH_4$) with a PSA unit that adsorbs $CO_2$ (and a little CO) to produce $H_2$ of high purity, although without specifying the solids employed.

The international application WO2017/042466 proposes a method of decarbonating natural gas by using a type A molecular sieve highly calcium exchanged and agglomerated with a fibrous magnesium clay. However, this method is only suitable for removing small contents of $CO_2$, typically less than 2% by volume of $CO_2$ in natural gas.

Beside zeolites, other solids have been tried for decarbonating gas streams, such as silica gels as described for example in the patent U.S. Pat. No. 8,298,986. However, the costs of manufacturing effective silica gels are relatively high, so there continues to be a need for adsorbents having high capacities and $CO_2$ adsorption selectivity.

Thus, an object of the present invention is to provide a method for decarbonating gas streams containing a large quantity of $CO_2$, typically more than 15% $CO_2$ by volume relative to the total volume of gas stream to be decarbonated.

Another object of the invention is to propose a method of decarbonating a gas stream leading to a final content of CO2 less than 5%, preferably less than 3%, and better still more preferably a final content of CO2 on the order of a few ppm, by volume relative to the total volume of the gas stream.

Another object is to propose a method of decarbonating a gas stream containing a large quantity of CO2, typically between 15% and 60%, indeed between 20% and 50%, for example between 25% and 40%, by volume relative to the total volume of gas stream to be decarbonated, the said method leading to a final $CO_2$ content of less than 5%, preferably less than 3%, and still more preferably a final $CO_2$ content on the order of a few ppm, by volume relative to the total volume of said gas stream.

Another object is to propose a method of decarbonating gas streams implementing means that are effective, economical and compatible with cost-effective industrial operations, particularly with reduced energy costs and improved selectivity.

Other technical problems will be seen in the description of the present invention that follows. It has now surprisingly been discovered that the said objects presented are achieved, in all or at least in part, thanks to the method of the invention that is now detailed in the following.

Thus, and according to a first aspect, the present invention concerns a method of decarbonating a gas stream, the said method comprising at least the steps of:
  a) supply of a gas stream containing 15% to 60% carbon dioxide, expressed as volume relative to the total volume of the gas stream,
  b) passage of said gas stream over a zeolitic agglomerate, and
  c) recovery of a gas stream depleted of $CO_2$,
  method wherein the zeolitic agglomerate comprises at least one binder and at least one zeolite, and has a mesoporous volume between 0.02 $cm^3 \cdot g^{-1}$ and 0.15 $cm^3 \cdot g^{-1}$ and a mesoporous volume fraction between 0.1 and 0.5, preferably between 0.15 and 0.45.

The zeolitic adsorbent in agglomerated form of the invention comprises macropores, mesopores and micropores. "Macropores" is understood as being pores the opening of which is larger than 50 nm. "Mesopores" is understood as being pores the opening of which is between 2 nm and 50 nm, inclusive. "Micropores" is understood as being pores the opening of which is less than 2 nm, typically strictly larger than 0 and less than or equal to 2 nm.

In the description of the present invention, "$V_{ma}$" designates the macroporous volume in $cm^3 \cdot g^{-1}$ of adsorbent, "$V_{me}$" designates the mesoporous volume in $cm^3 \cdot g^{-1}$ of adsorbent and "$V_{mi}$" designates the microporous volume expressed in $cm^3 \cdot g^{-1}$ of adsorbent.

The macroporous volumes $V_{ma}$ and mesoporous volumes $V_{me}$ are measured by mercury intrusion porosimetry. A mercury porosimeter such as Autopore® 9500 from Micromeritics is used to analyze the distribution of the pore volume contained in the macropores and in the mesopores.

The experimental method, described in the operation manual of the apparatus referring to the standard ASTM D4284-83, consists in placing a previously weighed adsorbent sample (zeolitic adsorbent in the form of agglomerates to be measured) (known as loss-on-ignition) in a cell of the porosimeter, then, after prior degassing (evacuation pressure of 30 μm Hg for at least 10 minutes), fill the cell with mercury at a given pressure (0.0036 MPa), then applying increasing pressure in stages up to 400 MPa to cause the mercury to penetrate progressively into the porous network of the sample, taking at least 15 stages of pressure up to 0.2 MPa, and then by applying increments of 0.1 MPa up to 1 MPa, then 0.5 MPa up to 10 MPa, then 2 MPa up to 30 MPa, then 5 MPa up to 180 MPa, and finally 10 MPa up to 400 MPa.

The relationship between the pressure applied and the characteristic dimension of the pore entry threshold (corresponding to an apparent pore diameter) is established by using the Laplace-Young equation and by assuming a cylindrical pore opening, an angle of contact between the mercury and the wall of the pores of 140° and a surface tension of the mercury of 485 dynes/cm. The volume increments $\Delta Vi$ of mercury introduced at each pressure stage Pi are recorded, which then makes it possible to trace the cumulative volume of mercury introduced as a function of the pressure applied V(Pi), or as a function of the apparent diameter of the pores V(Ii).

0.2 MPa is set as the value at which the mercury fills all of the inter-granular spaces, and beyond which the mercury is considered to penetrate into the pores of the adsorbent. The macroporous volume $V_{ma}$ of adsorbent is defined as being the cumulative volume of mercury introduced at a pressure of between 0.2 MPa and 30 MPa, corresponding to the volume contained in the pores of apparent diameter greater than 50 nm. The mesoporous volume $V_{me}$ of adsorbent is defined as being the cumulative volume of mercury introduced at a pressure of between 30 MPa and 400 MPa.

The method of measuring the porous volume by mercury intrusion not allowing access to the microporous volume, the total porous volume $V_{tot}$ as measured by mercury intrusion corresponds to the sum of the macroporous volume $V_{ma}$ and mesoporous volume $V_{me}$.

In the present description, the macroporous and mesoporous volumes $V_{ma}$ and $V_{me}$, as well as the sum thereof (total porous volume $V_{tot}$), of zeolitic adsorbents, expressed in $cm^3 \cdot g^{-1}$, are thus measured by mercury intrusion porosimetry in relation to the weight of the sample in anhydrous equivalent, i.e. the weight of the said adsorbent adjusted for the loss on ignition.

The mesoporous volume fraction (MVF) is the quotient of the mesoporous volume $V_{me}$ by the total porous volume, or $MVF = V_{me}/(V_{ma} + V_{me})$.

"Decarbonation," as used in the present invention, is understood as the process of removal of a gas stream containing $CO_2$, and "removal" is understood as meaning that upon completion of the process the gas stream no longer contains $CO_2$, or contains a quantity of $CO_2$ less than 5%, preferably less than 3%, and still more preferably a final content of $CO_2$ on the order of a few ppm, by volume relative to the total volume of said gas stream. A gas stream "depleted of $CO_2$" is the gas stream upon completion of the process as described above.

The method of the present invention is particularly suited for the decarbonation of a gas stream containing from 15% to 60% carbon dioxide ($CO_2$), preferably from 20% to 50%, still more preferably from 25% to 40%, by volume relative to the total volume of said gas stream.

According to one embodiment of the method of the present invention, the gas stream depleted of $CO_2$, comprises a quantity of $CO_2$ generally between a few ppmv and 10%, preferably from 0.01% to 5%, typically from 2 to 4%, but higher or lower values can be obtained depending on the applications concerned.

The method of the invention is also particularly suited for the decarbonation of gas streams including hydrogen sulphide (H2S), for example in concentrations of between 10 ppmv and 5000 ppmv.

Such gas streams with high contents of $CO_2$ are present in very numerous industrial fields, and in particular can be found in biogas which can contain for example up to 50% of $CO_2$, in combustion gases, in steel mills where said gas streams can have CO contents for example between 10% and 50%, by volume relative to the total volume of the gas streams, in natural gas that can contain up to 50% of $CO_2$, but also syngases, such as those for example resulting from the gasification of carbon and which contain around 20% $CO_2$ and about 20% to 50% of CO, citing here only the most common gas streams with high $CO_2$ content.

Thus, gas streams that are most suited to the method of the present invention are gas streams with $CO_2$ contents ranging from 15% to 60%, preferably from 20% to 50%, more preferably from 25% to 40%, and still more preferably about 35% by volume relative to the total volume of the gas stream.

These particularly suited gas streams also preferably contain one or more of the following gases:
  carbon monoxide (CO), generally from 20% to 50%, more generally from 30% to 45% by volume relative to the total volume of said gas flow, typically about 40%,
  hydrogen ($H_2$), generally from 15% to 25% by volume relative to the total volume of said gas flow, typically about 20%,
  nitrogen ($N_2$) and/or argon (Ar), generally from 5% to 15% by volume relative to the total volume of said gas flow, typically about 10%,
  methane ($CH_4$), generally from 0.5% to 50% by volume relative to the total volume of said gas stream, preferably from 1% to 20%, still more preferably from 1% to 10%, typically about 1% to 2%,
  water ($H_2O$), generally a few ppm (by volume, or ppmv) up to 4%, typically about 3%,
  hydrogen sulphide ($H_2S$), generally from 80 ppmv to 100 ppmv.

The zeolitic agglomerate used for the method of the present invention typically comprises crystals of zeolite(s) agglomerated with a binder, which is preferably a clay binder. The quantity of clay binder is generally between 1% and 30% by weight, preferably between 5% and 20% by weight, relative to the total weight of the zeolitic adsorbent.

According to a preferred aspect, the clay binder of the zeolitic agglomerate used for the method of the invention preferably comprises at least one clay chosen from among magnesium clays, and typically magnesium clay and a fibrous magnesium clay. "Fibrous magnesium clays" are understood as fibrous clays containing magnesium and preferably hormites, the principal representatives of which are sepiolite and attapulgite (or palygorskite). Sepiolite and attapulgite are the preferred hormites within the context of the present invention.

Furthermore, a zeolitic adsorbent material is preferred having a binder that comprises only one or more clays from the family of hormites. According to another embodiment, the binder comprises a mixture of clay(s) composed of at least one fibrous magnesium clay, for example a hormite, and at least one other clay, for example selected from among montmorillonites, for example bentonite. According to another preferred embodiment, binders are preferred that comprise at least 50% by weight of at least one hormite relative to the total weight of the binder. The preferred mixtures of clays are sepiolite/bentonite and attapulgite/bentonite mixtures, more preferably attapulgite/bentonite, and most preferred are these mixtures in which the hormites (sepiolite or attapulgite) are present in at least 50% by weight relative to the total weight of the binder.

The said at least one zeolite of the zeolitic agglomerate defined above is the zeolite in the form of crystals and preferably Faujasite zeolite crystals, for example zeolite crystal selected from among the zeolites X, LSX, MSX, Y and mixtures thereof. The zeolite crystals are preferably present as sodium, and generally a sodium content, expressed as sodium oxide ($Na_2O$) of more than 9.0% by weight of oxide relative to the total weight of the agglomerate. The zeolites described above all have a Si/Al atomic ratio of between 1 and 3 inclusive.

The content of crystals of zeolite(s) is generally between 70% and 99% by weight, preferably between 80% and 95% by weight, relative to the total weight of the adsorbent.

The zeolitic agglomerate defined above can further comprise one or more additives and/or fillers well known to the person skilled in the art, such as for example a pore-forming agent, carboxymethylcellulose (CMC), a general reinforcing agent, fibres, such as fibres of glass, carbon, Kevlar® and others), nanotubes of carbon (NTC), colloidal silica, a polymer, fabrics and others. The additive(s) and/or filler(s) represent a maximum of 10% by weight, preferably a maximum of 5% by weight relative to the total weight of the zeolitic adsorbent material usable within the scope of the present invention.

As previously indicated, the zeolitic adsorbent usable for the decarbonation method of the present invention has a very particular porous profile, characterized by
  a mesoporous volume of between 0.02 $cm^3 \cdot g^{-1}$ and 0.15 $cm^3 \cdot g^{-1}$, (<50 nm) Hg, and
  a mesoporous volume fraction of between 0.1 and 0.5, preferably 0.15 and 0.45.

The zeolitic agglomerate usable in the method of the present invention can be in any form known to the person skilled in the art, such as in the form of spun yarns, beads, trilobes, by way of non-limiting examples. However, it is preferred to use an adsorbent in the form of beads, and more particularly beads of a size between 0.5 mm and 5 mm, preferably between 1 mm and 3 mm, and still more preferably between 1.6 mm and 2.5 mm. Preferred, therefore, are the agglomerated zeolitic adsorbent materials formed according to all techniques known to the person skilled in the art, such as extrusion, compaction, agglomeration on granulator base, granulator drum, atomisation and others.

This adsorbent zeolitic agglomerate can be obtained according to techniques well known to the person skilled in the art, and particularly by agglomeration of zeolite crystals with one or more clay(s) and possibly additives and other aids for agglomeration and forming. The specific pore profile of the zeolitic agglomerate used in the method of the invention can also be obtained according to conventional techniques well known to the person skilled in the art, and for example by introducing one or more porogenic agent(s) suitable for creating the mesoporosity by burning during the calcination of the zeolitic agglomerate.

The zeolitic agglomerate described above can be used alone or in association with a mixture with one or more other zeolitic agglomerate(s) and/or other adsorbents. For example, the zeolitic agglomerate described above can be used in one or more stacked, alternating or sequenced beds. By way of illustrative but non-limiting example, it is possible to associate the zeolitic agglomerate previously defined with one or more activated aluminas or other zeolitic agglomerates, upstream, for drying the gas stream.

Thus, the method of the present invention makes it possible to eliminate large quantities of $CO_2$, particularly large quantities of $CO_2$ present in a stream rich in CO, by means of an agglomerated zeolitic adsorbent as defined above. The characteristics of the said zeolitic adsorbent confer a strong affinity for $CO_2$ and rapid adsorption kinetics.

According to a preferred embodiment, the method of the invention implements conventional and well-known adsorption techniques, particularly the techniques of adsorption modulated by volume, pressure, temperature, volume and pressure or pressure and temperature. These techniques are better known under their acronyms in English as VSA, PSA, TSA, VPSA and PTSA, respectively. In particular, it is preferred to use the method according to the VSA, VPSA, ESA or PTSA technique, and better still according to the VSA, PSA or VPSA technique, particularly for the decarbonation of gases rich in $CO_2$ and CO, such as steel mill gases.

The method of the present invention can be implemented under temperature and pressure conditions well known to the person skilled in the art.

Typically, the method of the invention can be carried out at a temperature of between 0° C. and 100° C., and preferably between 0° C. and 80° C., still more preferably between 10° C. and 60° C., typically between 20° C. and 50° C., for example at ambient temperature.

The pressure applied throughout the method of the present invention can also vary greatly. However, it is preferred to operate with a pressure generally between 200 kPa and 400 kPa, still more preferably at a pressure equal to about 300 kPa.

The method of the invention can be carried out in any type of process reactors known to the person skilled in the art, capable of withstanding the operational conditions defined above, particularly in terms of temperature and pressure, to carry out adsorption/regeneration cycles, typically of the VSA, PSA, TSA, VPSA and PTSS type, and by way of non-limiting examples, reactor, packed or other column, tubular reactor, and others. The method of the invention can be performed in one or more of the reactors defined above, placed in series or in parallel, in any suitable configuration, vertical and/or horizontal. For example, one or more column reactors can be placed in parallel for the adsorption phases and one or more column reactors in parallel for the regeneration phases.

It is also possible and often advantageous to provide a step of drying the gas stream to be decarbonated for example on a bed of alumina, prior to engaging said gas stream in the decarbonation method according to the invention.

The invention also concerns the use, for the decarbonation of a gas stream, of a zeolitic agglomerate as defined above, i.e. comprising at least one binder and at least one zeolite, and having a mesoporous volume of between 0.02 $cm^3 \cdot g^{-1}$ and 0.15 $cm^3 \cdot g^{-1}$ and a mesoporous volume fraction of between 0.1 and 0.5, preferably between 0.15 and 0.45, as previously defined.

Thus, the zeolitic agglomerate comprises a binder which is preferably a clay binder in a quantity generally between 1% and 30% by weight, preferably between 5% and 20% by weight, relative to the total weight of the zeolitic adsorbent.

As previously indicated, said clay binder preferably comprises at least one clay selected from among magnesium clays, and typically a magnesium clay and a fibrous magnesium clay, selected from sepiolite and attapulgite (or palygorskite), possibly in a mixture with at least one other clay selected for example from among montmorillonites, particularly bentonite. When the binder is a clay mixture, it is preferred that the binder comprise at least 50% by weight of at least one hormite relative to the total weight of the binder. The preferred mixtures of clays are sepiolite/bentonite and attapulgite/bentonite mixtures, more preferably attapulgite/bentonite, and most preferred are these mixtures in which the hormites (sepiolite or attapulgite) are present in at least 50% by weight relative to the total weight of the binder.

The crystals of zeolite(s) of the zeolitic agglomerate are preferably Faujasite zeolite crystals, for example zeolite crystals selected from among the X, LSX, MSX, Y zeolites and mixtures thereof. The zeolite crystals are preferably present as sodium, and generally a sodium content, expressed as sodium oxide ($Na_2O$) of more than 9.0% by weight of oxide relative to the total weight of the agglomerate. The zeolites described above all have a Si/Al atomic ratio of between 1 and 3 inclusive.

The content of crystals of zeolites is generally between 70% and 99% by weight, preferably between 80% and 95% by weight, relative to the total weight of the adsorbent.

The zeolitic agglomerate defined above can further comprise one or more additives and/or fillers well known to the person skilled in the art, such as for example a pore-forming agent, carboxymethylcellulose (CMC), a general reinforcing agent, fibres, such as fibres of glass, carbon, Kevlar® and others), nanotubes of carbon (NTC), colloidal silica, a polymer, fabrics and others. The additive(s) and/or filler(s) represent a maximum of 10% by weight, preferably a maximum of 5% by weight relative to the total weight of the zeolitic adsorbent material usable within the scope of the present invention.

The zeolitic agglomerate usable in the method of the present invention can be of any form known to the person skilled in the art, as previously indicated.

The zeolitic agglomerate described above can be used alone or in association with a mixture with one or more other zeolitic agglomerate(s) and/or other adsorbents. For example, the zeolitic agglomerate described above can be used in one or more stacked, alternating or sequenced beds. By way of illustrative but non-limiting example, it is possible to associate the zeolitic agglomerate previously defined with one or more activated aluminas or other zeolitic agglomerates, upstream, for drying the gas stream.

The use of the zeolitic agglomerate defined above for the decarbonation of a gas stream, and particularly a gas stream containing 15% to 60% (by volume) of carbon dioxide ($CO_2$), preferably from 20% to 50%, still more preferably between 25% and 40% relative to the total volume of the gas stream to be processed, has many advantages.

Thus, it has been observed that the zeolitic adsorbent of the invention has a very large capacity as well as a very high selectivity, particularly due to the specific porous profile described above.

Moreover, the zeolitic adsorbent, in the utilisation claimed in the present invention, has a lifespan that is quite attractive, and in particular longer than most of those observed with the other decarbonation systems known from the prior art.

Thanks to these excellent properties both with respect to the mechanical strength and the adsorption selectivity and capacity, the zeolitic agglomerate used in the method of the invention makes it possible to create decarbonation units that are very compact in terms of size, and much more cost-effective in terms of energy use.

Moreover, the use of the present invention makes it possible to observe relatively short adsorption times, compared to those known from the prior art, and for example adsorption times on the order of five seconds to 10 minutes, preferably from five seconds to four minutes and typically from 10 to 60 seconds.

Another very interesting advantage is the fact that, as a result of the zeolitic agglomerate of the present invention, it is possible to perform the regeneration steps under vacuum conditions that are less than those required with the other decarbonation systems described in the prior art.

The concentrations of $CO_2$ in the gas stream upon completion of the process can thus easily be close to 5%, even 3%, by volume, and even only a few ppmv.

Without being bound by the theory, it has been observed that the use of the zeolitic agglomerate described above enables a rapid diffusion of the $CO_2$, thus making the mass transfer fronts extremely narrow.

The zeolitic agglomerate that can be used in the method of the present invention, further proves to be a very versatile product, and can consequently be used for a very wide variety of applications, particularly in the field of liquid or gas hydrocarbons, such as for example the operations in the drying, decarbonation, desulphurisation, or in the fields of industrial gases, for example the operations of decarbonation of air, nitrogen/oxygen separation, and others).

Methods of Analyses

Chemical Analysis of the Zeolitic Agglomerates

The elemental chemical analysis of the zeolitic conglomerate usable in the method of the invention can be performed according to different analytical techniques known to the person skilled in the art. Among these techniques are the technique of chemical analysis by x-ray fluorescence as described in the standard NF EN ISO 12677:2011 on a wavelength dispersive spectrometer (WDXRF), for example the Tiger S8 spectrometer from the Bruker company.

X-ray fluorescence is a non-destructive spectral technique using the photoluminescence of atoms in the domain of x-rays, to establish the elemental composition of a sample. The excitation of the atoms, which is usually and generally performed by an x-ray beam or by bombardment with electrons, generates specific radiations after return of the atom to the fundamental state. After calibrating for each oxide, a measurement uncertainty of less than 0.4% by weight is obtained in a conventional way.

The x-ray fluorescence has the advantage of depending very little on the chemical combination of the element, which offers a precise determination, both quantitative and qualitative. After calibrating for each oxide $SiO_2$ and $Al_2O_3$, as well as $Na_2O$, a measurement uncertainty of less than 0.4% by weight is obtained in a conventional way.

Other methods of analysis are for example illustrated by the methods by atomic absorption spectrometry (AAS) and atomic emission spectrometry with high-frequency induced plasma (ICP-AES) described in the standards NF EN ISO 21587-3 or NF EN ISO 21079-3 on a Perkin Elmer 4300DV type apparatus, for example.

The elemental chemical analyses described above make it possible both to verify the Si/Al atomic ratio of the zeolite used in the zeolitic agglomerate as well as the Si/Al atomic ratio of said agglomerate. In the description of the present invention, the measurement uncertainty of the Si/Al atomic ratio is ±5%. The measurement of the Si/Al atomic ratio of the zeolite present in the zeolitic agglomerate can also be measured by solid-phase silicon nuclear magnetic resonance (NMR) spectroscopy.

Qualitative and Quantitative Analysis by X-Ray Diffraction

The zeolite content in the zeolitic adsorbent material is evaluated by x-ray diffraction analysis (DRx), according to methods known to the person skilled in the art. This identification can be performed by means of a Bruker DRX apparatus.

This analysis makes it possible to identify the different zeolites present in the zeolitic adsorbent material because each of the zeolites has a unique diffractogram defined by the position of the diffraction peaks and by their relative intensities.

The zeolitic adsorbent materials are ground then spread out and smoothed onto the sample holder by simple mechanical compression.

The conditions for acquiring the diffractogram performed on the Bruker D5000 apparatus are as follows:
Cu tube used at 40 kV-30 mA;
size of slots (divergent, diffusion and analysis)=0.6 mm;
filter: Ni;
sample rotation device: 15 rpm$^{-1}$;
measurement range: $3°<2\theta<50°$;
step: 0.02°;
count time per step: 2 seconds.

The interpretation of the diffractogram obtained is done with EVA software, identifying zeolites from the ICDD PDF-2 database, release 2011.

The quantity of zeolitic fractions, by weight, is measured by DRX analysis on the D5000 apparatus made by Bruker, then the quantity by weight of zeolitic fractions is evaluated by means of TOPAS software from the Bruker company.

The invention will be better understood in light of the following examples, which are provided solely by way of illustration and in no way limit the scope of the invention.

EXAMPLES

The following examples present tests of adsorption of $CO_2$ included in a CO-rich gas stream, according to a VPSA type method, utilising different adsorbents.

The adsorbents tested are listed below:
Sample a: A2AW® silica gel from the KD Corporation in the form of beads of size 2-5 mm.
Sample B: zeolitic agglomerate of mesoporous volume equal to 0.065 cm$^{3.-1}$, and the mesoporous volume fraction is equal to 0.31 comprising about 20% attapulgit binder and about 80% type FAU zeolite with a Si/Al ratio of 1.19, the zeolitic agglomerate being in the form of beads with a granulometry of 1.6-2.5 mm.
Sample C: zeolitic agglomerate similar to sample B, but in which the agglomeration binder is sepiolite The charge in the adsorption column of a pilot installation is identical with each sample and is equal to 379 g. The column of the adsorption pilot has a diameter of 2.2 cm and a height of 2 m. The height of the charge in the column varies for each sample, depending on the density of each sample:

height for sample A: 1.45 m;
height for sample B: 1.59 m;
height for sample C: 1.49 m.

The gas mixture that feeds the adsorption column has a volume composition of 35% CO, 35% $CO_2$, 10% $N_2$ and 20% $H_2$. The feed flow rate is set at 8 NL·min$^{-1}$ and 16 NL·min$^{-1}$ at a temperature of 40° C. and a pressure of 300 kPa.

Upon completion of the adsorption step, the regeneration is performed for 100 seconds while reducing the pressure to a vacuum level of 20-30 kPa, including a purge step of 50 seconds under vacuum by means of a gas of volume composition of around 62% CO, 2.7% $CO_2$ and the remainder to 100% of N2.

Example 1

The total adsorption capacities of $CO_2$ of sample A and sample B are compared in order to study the difference between a silica gel and a zeolitic agglomerate. The gaseous mixture that feeds the column is as described above. The feed flow rate is set at 8 NL·min$^{-1}$ at a temperature of 40° C. and a pressure of 300 kPa. As previously indicated, the same quantity of adsorbent of 379 g is used for each sample.

The adsorption phase is stopped when the samples are completely saturated with $CO_2$, i.e. the concentrations of the constituents of the incoming gas stream are identical with those of the outgoing gas stream. The adsorption time required for each sample to obtain the total saturation thereof is as follows:

Sample A: 450 seconds;
Sample B: 1055 seconds.

The breakthrough time to reach a volume concentration of 0.1% of $CO_2$, for each sample is:

Sample A: 63 seconds;
Sample B: 747 seconds.

These results clearly show that, in equal quantity, sample B (zeolitic agglomerate according to the invention) has a total adsorption capacity of $CO_2$ more than twice what was observed with sample A (silica gel, comparative sample). If the adsorption is stopped at the beginning of the breakthrough, the performance of sample B is about 12 times better than that of sample A.

This example clearly shows that the use of sample B (zeolitic agglomerate according to the invention) leads to a much longer use than when a silica gel is used, if the same quantity of adsorbent is used. Moreover, the adsorption unit can be made more compact by using a zeolitic agglomerate rather than a silica gel, which makes it possible to reduce both investment and operational costs.

Example 2

Under the same operating conditions as in the example 1, this example compares the dynamic adsorption capacities of $CO_2$ of samples A and C in order to study the differences between a silica gel and a molecular sieve. The feed flow rate is set at 16 NL·min$^{-1}$ at a temperature of 40° C. and a pressure of 300 kPa. The quantity of each sample used is 379 g.

The adsorption phase is stopped when the volume concentration of $CO_2$ of the outgoing gas stream reaches 2.6% (breakthrough concentration).

Upon completion of the adsorption step, the regeneration is performed for 100 seconds while reducing the pressure to a vacuum level of 20 kPa, including a purge step of 50 seconds under vacuum by means of a gas of volume composition of around 62% CO, 2.7% $CO_2$ and the remainder to 100% of $N_2$. Fifteen (15) adsorption/desorption cycles are performed to reach a stable breakthrough time for each sample.

The breakthrough time to reach a volume concentration of 2.6% of $CO_2$, for each sample is:

Sample A: 15 seconds;
Sample C: 38 seconds.

These results clearly show that, in equal quantity, sample C (zeolitic agglomerate according to the invention) has a performance 2.5 times better than sample A (silica gel, comparative sample) and therefore by using a zeolitic agglomerate the time of use will be longer than with a silica gel if the same quantity of the adsorbent is used, due to the possibility of reducing the number of regeneration cycles.

Example 3

Under the same operating conditions as in the example 1, this example compares the dynamic adsorption capacities of $CO_2$ of samples A and C in order to study the differences between a silica gel and a molecular sieve. The feed flow rate is set at 16 NL·min$^{-1}$ at a temperature of 40° C. and a pressure of 300 kPa. The quantity of each sample used is 379 g. The regeneration of each of samples A and C is compared in order to study the differences between a silica gel and zeolitic agglomerate. The gas mixture entering the adsorption column has a volume composition of 35% CO, 35% $CO_2$, 10% $N_2$ and 20% $H_2$. The feed flow rate is set at 8 NL·min$^{-1}$ at a temperature of 40° C. and a pressure of 300 kPa. The quantity of adsorbent is identical for each sample and is 379 g.

The adsorption phase is stopped when the volume concentration of $CO_2$ reaches 2.6% (breakthrough concentration). Upon completion of the adsorption step, the regeneration is performed for 100 seconds while reducing the pressure to a specific vacuum level, including a purge step of 50 seconds under vacuum by means of a gas of volume composition of around 62% CO, 2.7% $CO_2$ and the remainder to 100% of $N_2$. The specific vacuum level mentioned above varies depending on the sample in order to obtain the same breakthrough time of 36 seconds (stable after a multitude of cycles) in order to obtain an output volume concentration of 2.6% $CO_2$ for each sample. Fifteen (15) adsorption/desorption cycles are performed to reach a stable breakthrough time for each sample.

The vacuum level for each sample is:
Sample A: 20 kPa;
Sample C: 40 kPa.

These results clearly show that, with an equal quantity of adsorbent and identical adsorbent performance, sample C, zeolitic agglomerate according to the invention, requires one half the amount of vacuum required for sample A (silica gel, comparative sample) and therefore by using a zeolitic agglomerate (sample C), operational costs can be reduced during regeneration.

The invention claimed is:
1. A method of decarbonating a gas stream, the method comprising at least the steps of:
a) supply of a gas stream containing 15% to 60% carbon dioxide, expressed as volume relative to the total volume of the gas stream, b) passage of the gas stream over a zeolitic agglomerate, and c) recovery of a gas stream depleted of $CO_2$, wherein the zeolitic agglomerate comprises at least one binder and at least one zeolite, and has a mesoporous volume between 0.02 $cm^3 \cdot g^{-1}$ and 0.15 $cm^3 \cdot g^{-1}$ and a mesoporous volume fraction between 0.1 and 0.5, wherein the at least one binder is a mixture of clays comprising a montmorillonite clay and at least 50% by weight of a hormite clay, wherein the zeolitic agglomerate is the form of beads having a size between 1.6 mm and 2.5 mm, wherein the zeolitic agglomerate comprises crystals of zeolite(s) agglomerated with between 1% and 30% by weight, relative to the total weight of the zeolitic adsorbent, of the at least one binder, wherein the at least one zeolite of the zeolitic agglomerate is a zeolite in the form of Faujasite type zeolitic crystals, selected from among X, LSX, MSX and Y zeolites and mixtures thereof, and wherein the at least one zeolite of the zeolitic agglomerate is a zeolite in the form of crystals present in sodium form, with a sodium content expressed as sodium oxide ($Na_2O$) greater than 9.0% by weight of oxide relative to the total weight of the agglomerate.

2. The method as claimed in claim 1, wherein the gas stream to be decarbonated contains from 15% to 60% carbon dioxide, by volume relative to the total volume of the gas stream.

3. The method as claimed in claim 1, wherein the gas stream to be decarbonated has a $CO_2$ content ranging from 15% to 60%, by volume relative to the total volume of the gas stream, and further contains one or more of the following gases:

carbon monoxide (CO), generally from 20% to 50%, by volume relative to the total volume of the gas stream, hydrogen ($H_2$), from 15% to 25% by volume relative to the total volume of the gas stream, nitrogen ($N_2$) and/or argon (Ar), from 5% to 15% by volume relative to the total volume of the gas stream, methane ($CH_4$), from 0.5% to 50% by volume relative to the total volume of the gas stream, water ($H_2O$), up to 4%, hydrogen sulphide ($H_2S$), from 80 ppmv to 100 ppmv.

4. The method as claimed in claim 1, the method being carried out at a temperature of between 0° C. and 100° C.

5. The method as claimed in claim 1, the method being carried out at a pressure of between 200 kPa and 400 kPa.

6. The method as claimed in claim 1, wherein the montmorillonite clay comprises bentonite.

7. The method as claimed in claim 1, wherein the hormite clay comprises attapulgite and/or sepiolite.

* * * * *